United States Patent
Kumar et al.

(10) Patent No.: US 10,922,998 B2
(45) Date of Patent: Feb. 16, 2021

(54) SYSTEM AND METHOD FOR ASSISTING AND GUIDING A VISUALLY IMPAIRED PERSON

(71) Applicants: Pavan Kumar, Gorakhpur (IN); Durgesh Kumar, Gorakhpur (IN); Pankhuri Johari, Gorakhpur (IN)

(72) Inventors: Pavan Kumar, Gorakhpur (IN); Durgesh Kumar, Gorakhpur (IN); Pankhuri Johari, Gorakhpur (IN)

( * ) Notice: Subject to any disclaimer, the term of this patent is extended or adjusted under 35 U.S.C. 154(b) by 0 days.

(21) Appl. No.: 14/532,024

(22) Filed: Nov. 4, 2014

(65) Prior Publication Data
US 2020/0152084 A1 May 14, 2020

(30) Foreign Application Priority Data
Nov. 11, 2013 (IN) .......................... 3306/DEL/2013

(51) Int. Cl.
| | |
|---|---|
| G09B 21/00 | (2006.01) |
| H04N 5/247 | (2006.01) |
| H04N 13/204 | (2018.01) |
| G06F 3/16 | (2006.01) |
| G06T 7/90 | (2017.01) |
| H04N 5/232 | (2006.01) |
| H04R 1/02 | (2006.01) |
| H04R 1/40 | (2006.01) |
| H04R 3/12 | (2006.01) |
| G01S 13/89 | (2006.01) |
| G01C 21/20 | (2006.01) |
| G06F 13/10 | (2006.01) |
| G01S 19/13 | (2010.01) |

(52) U.S. Cl.
CPC .......... *G09B 21/006* (2013.01); *G01C 21/20* (2013.01); *G01S 13/89* (2013.01); *G06F 3/16* (2013.01); *G06F 13/102* (2013.01); *G06T 7/90* (2017.01); *H04N 5/23203* (2013.01); *H04N 5/247* (2013.01); *H04N 13/204* (2018.05); *H04R 1/028* (2013.01); *H04R 1/403* (2013.01); *H04R 3/12* (2013.01); *G01S 19/13* (2013.01); *G06F 2213/40* (2013.01); *G06T 2207/10012* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2012/0062357 A1* | 3/2012 | Slamka | G09B 21/006 340/4.11 |
| 2013/0215281 A1* | 8/2013 | Hobby | H04N 7/185 348/207.1 |
| 2014/0052555 A1* | 2/2014 | MacIntosh | G06K 9/00664 705/23 |

* cited by examiner

*Primary Examiner* — James M Anderson, II

(57) ABSTRACT

A system and method is provided for assisting and guiding a visually impaired person. The system (100) includes a remote (106) configured to take request from a user; a head mounted device (102) configured to capture image and signal in the vicinity of the user and to communicate audio signal regarding the object and navigation; a GPS equipped mobile hand device (109) to navigate in a remote location; and a pocket computer (104) and a server computer (105) configured to collect and process signals received from the head mounted device (102), remote (106) and GPS equipped mobile hand device (109).

20 Claims, 10 Drawing Sheets

SYSTEM AND METHOD FOR ASSISTING AND GUIDING A VISUALLY IMPAIRED PERSON

The following specification particularly describes the invention and the manner in which it is to be performed.

BACKGROUND

Field

In general, the subject matter relates to the field of visual aid for visually challenged person. More particularly, but not exclusively, the subject matter relates to assisting a visually challenged person in dealing with objects that are static or dynamic.

Discussion of Related Field

The challenge for a visually impaired person is to navigate and perform his/her routine schedule independently. The navigation problem was addressed to some extent by use of white cane, cane embedded with sensor and watchdog that assist the visually impaired individuals to navigate.

One of the conventional ways is by means of a watch dog or an individual giving assistance to the visually impaired individuals to navigate around. Here the visual impaired person when getting assisted by individual becomes dependent on him/her for daily routine in the other case it is restricted to the individuals one who can train to interpret the information from the watch dog.

Further, another conventional technique used for assisting visually impaired is a white cane. It is designed primarily as a mobile tool used to detect objects in the path of a user. The lighter and lengthier the cane, mobility and safety are improved accordingly. However, by using cane, objects that are in the vicinity of the cane (1 to 1.15 m) can be detected.

The problem of navigating in remote and unknown places has been attempted to be addressed by embedding communication technologies into white cane. Communication technologies, such as, GPS, mobile phone and smart phone, among others, are associated with cane to address the aforementioned problem. It assists an individual in navigating in remote location, but it fails to carry out daily schedule like opening the door, locating refrigerator, and locating windows, and among others.

Another difficulty to be addressed is when objects are dynamic. This problem is attempted to be solved by a hand held navigation aid integrated with sensors (Example: ultrasound sensor and optical sensor, among others) for detecting obstacles, objects or hindrances. However, the problem of recognizing and carrying out routine activities such as locating doors, bed and window, among others in indoor and identifying road, grass lawn and vehicles, among others in outdoor, still exists.

Therefore, in light of the foregoing discussion, a need exists for a technique to assist in navigating and performing routine schedule and also properly acquaint with the surrounding, so that the visually challenged individual is confident enough to work independently.

SUMMARY

In an embodiment, a system is provided for assisting and guiding a visually impaired person. The system includes a remote configured to take request from a user, a head mounted device configured to capture image and signal in the vicinity of the user and to communicate audio signal regarding the object and navigation; a GPS equipped mobile device to navigate in a remote location; and a pocket computer and a Server computer configured to collect and process signals received from the head mounted device, remote and GPS equipped mobile device.

In another embodiment, a method is provided for assisting and guiding a visually impaired person. The method includes receiving a request from a user through a remote; capturing image and signal in the vicinity of the user through a head mounted device; processing data received from the head mounted device, remote and GPS equipped mobile device; and communicating audio signal and characteristic sound regarding identified objects and navigation.

BRIEF DESCRIPTION OF DRAWINGS

Embodiments are illustrated by way of example and not limitation in the Figures of the accompanying drawings, in which like references indicate similar elements and in which:

FIG. 0.2b illustrates the belt tag camera device 103 for the visual aid;

DETAILED DESCRIPTION

Figure 1:
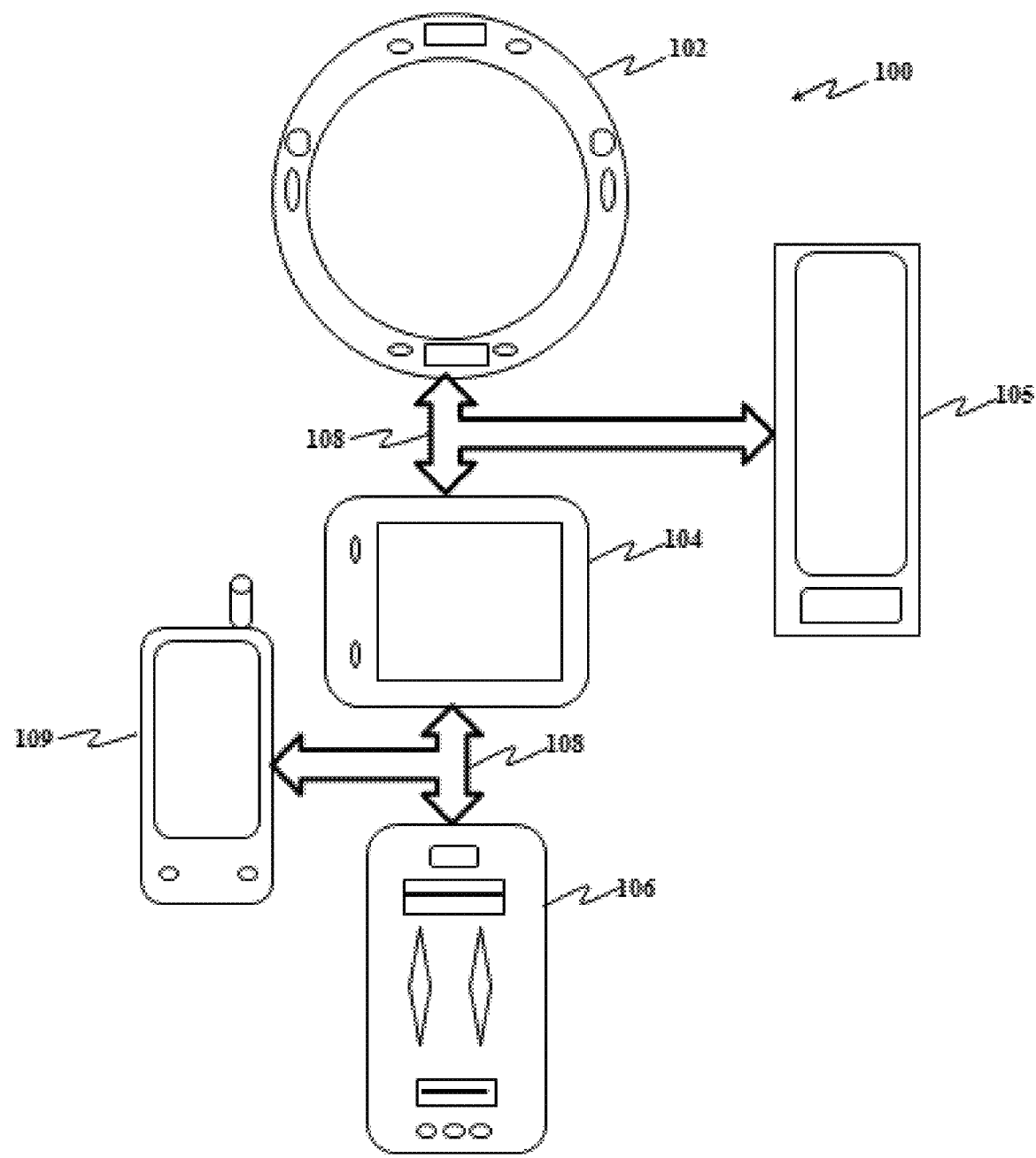
FIG. 1 is a schematic representation of an exemplary system 100 for assisting an visually impaired person, in accordance with an embodiment.

I. OVERVIEW
II. EXEMPLARY SYSTEM
III. EXEMPLARY METHOD
IV. FIRST EXAMPLE
V. SECOND EXAMPLE
VI. CONCLUSION

1. Overview

Embodiments relate to system and method for assisting a visually impaired individual in navigating and performing daily activities.

In an embodiment, a system for assisting a visually impaired individual is provided. The system includes a head mounted device, a remote, a GPS equipped mobile hand device, a server computer and pocket computer. The head mounted device is integrated with one or more cameras and one or more speakers. The pocket computer and server computer are configured and programmed with artificial intelligence and genetic algorithm to process and store signals received from the head mounted device. The remote is integrated with a voice command device, electro-mechanical keypad for selecting and operating the functions of the system, to generate a request and control the pocket computer. The GPS equipped mobile hand device is used to navigate in remote locations.

The head mounted device comprises of cameras, such as, optical camera, radar camera and infrared camera. The optical camera is placed in front, sides and back of the head mounted device.

The head mounted device further comprises two sets of speakers, peripheral speakers and 3-d acoustic speakers, which are configured to receive audio signals from the pocket computer and the server computer. The audio signals are characteristic sound or coded sound or name of the object, based on the surrounding, distance and nature of the object, among others.

The head mounted device is incorporated with waist belt tag camera device. The belt tag camera device is an integral part of the head mounted device comprising of cameras and speakers. The belt tag camera device communicates with the head mounted device.

The pocket computer is configured to receive the signal from the remote and process the same, and send it further to the head mounted device and GPS equipped mobile hand device.

The GPS equipped mobile hand device is connected to the pocket computer and the remote through a communication network. This GPS equipped mobile hand device is also operated for its mobile functions and GPS utility via the remote.

The remote is integrated with electro mechanical keypad, cameras and voice command device configured to take request from user and operate various functions of the system. Further the remote is integrated with touch screen to select the camera and zoom in any segment of frame the user present in and also provides provision to activate a particular set of cameras or speaker.

The head mounted device is configured to receive the signal from the pocket computer. Upon receiving the signal, the cameras start operating to capture the signal present in the fore ground. The signals include microwave, audio, image, spectral signals and infrared signals.

The pocket computer and server computer are configured to store and process the signal received from the head mounted device. Pocket computer is carried by the user. The pocket computer communicates with the head mounted device, remote, GPS equipped mobile hand device and the server computer. The pocket computer performs all the operation independently all the time, except for the time when the user is located in home or workplace, during which the server is activated and performs the task.

The server computer is configured to store data corresponding to campus frequently visited, objects encountered, persons frequently encountered, sounds associated with different machines in factory, horns on roads, voices of different persons matched with their identity details, a objects in a particular location and among others and are subjected to artificial intelligence processing by programming with artificial neural network, genetic algorithm and among others. Further, the server computer, upon request from the user, can search objects in the location by providing instructions to the head mounted device. Furthermore, the server computer provides instructions to the user via speakers to reach the objects, which the user is searching for.

The pocket computer upon receiving the signal from the head mounted device starts to process the signal using the pre-fed programs, such as, artificial intelligence and genetic algorithm to generate a 3-D binary image. The pocket computer calculates the wavelength and the frequency of the signal received against the various scanned static and dynamic objects in foreground (nearest objects). Further, the background signals are dampened for better perception of foreground objects after initial recognition of objects in the surroundings. The various scanned objects are calculated for their relative change in positions such as parallax or angular variation. The pocket computer further analyzes the size, shape, colour, and hardness of the objects using the received signals to translate into a coded sound which is communicated to the speaker, which is heard by the user. The pocket computer further postulates a frame by coupling the coded sound with the frame, in which the user is, to give the information regarding the relativity of the object or obstacle present in the path of the user.

The following detailed description includes references to the accompanying drawings, which form a part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiment can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

II. Exemplary System

FIG. 1 is a schematic representation of an exemplary system 100 for assisting a visually impaired person, in accordance with an embodiment. The system 100 includes a head mounted device 102, a pocket computer 104, a server computer 105, a remote 106 and a GPS equipped mobile hand device 109, coupled by a communication network 108.

The head mounted device 102, the server computer 105, the remote 106, and the GPS equipped mobile hand device 109 are configured to communicate with the pocket computer 104 through a communication network 108. The communication can occur through various wireless protocols.

Figure 2A:
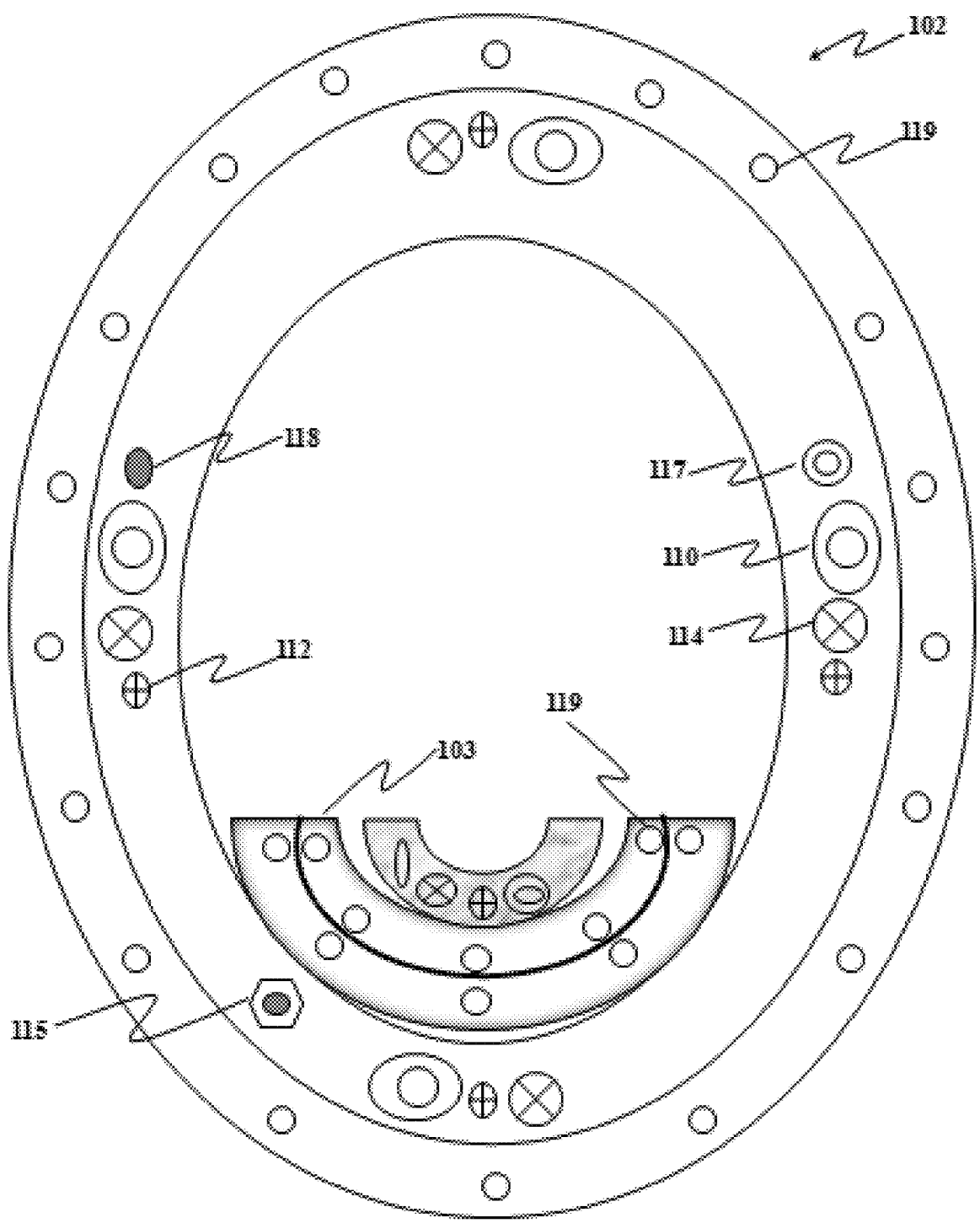
FIG. 2a illustrates the head mounted device 102 for the visual aid.

FIG. 2a is a schematic representation of the head mounted device 102, which is integrated with belt tag camera device 103, optical camera 110, infra red camera 112, radar based camera 114, alarm light blinker 115, Voice speaker for GPS/Mobile directed voice 117, voice speaker 118 for verbal dictation after visual image processing and peripheral 3-d acoustic speakers 119.

Figure 3:
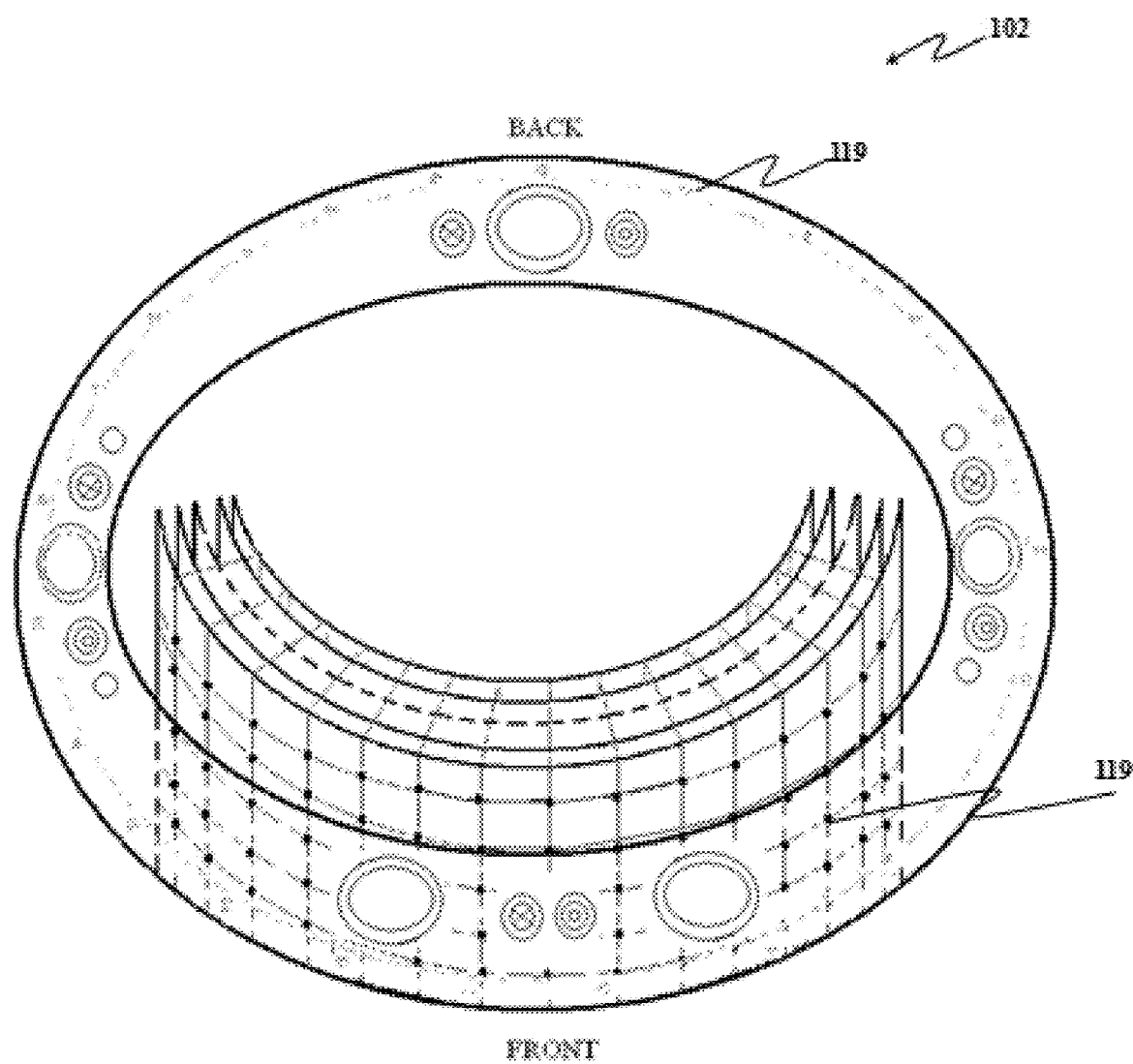
FIG. 3 illustrates top view of the head mounted device 102 with the cameras.

In an embodiment, the first set peripheral of 3-D acoustic speakers 119 are placed on the circumference of the head mounted device 102. Another set of 3-D acoustic peripheral speakers 119 are placed on inner surface of the head mounted device 102 in its front portion between the ear pinna resting on forehead in the order of a multi tier system as depicted in FIG. 3. It is opposed to forehead for better sound conduction through frontal bone.

Figure 4A:
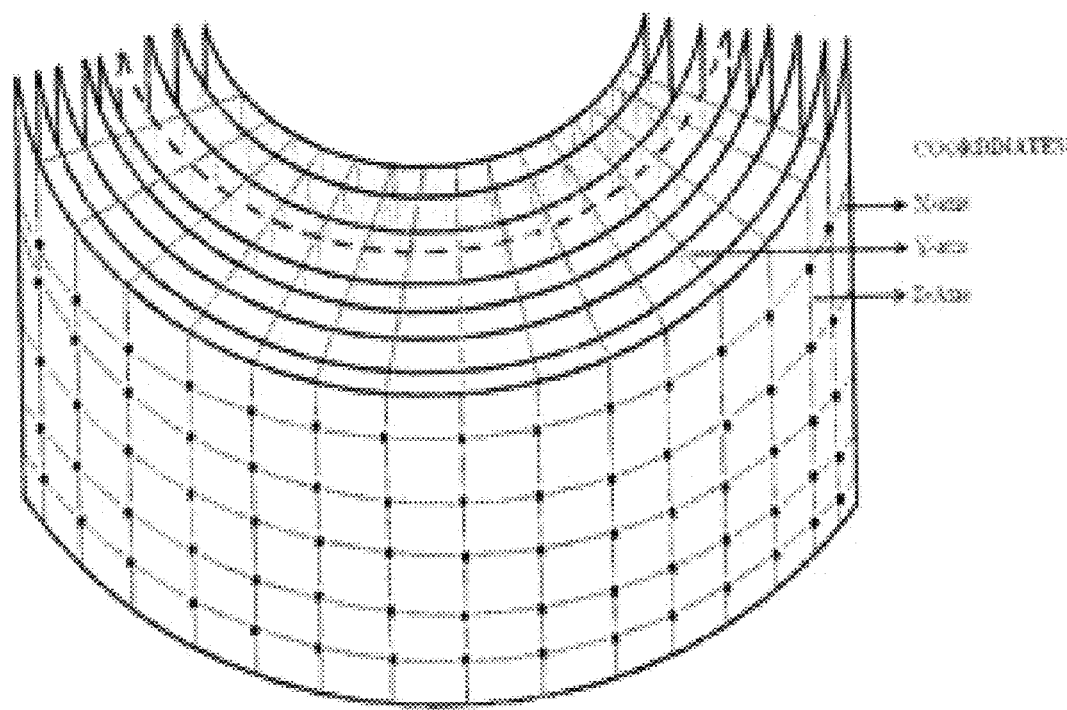
FIG. 4a illustrates multilaminar acoustic matrix display tier device in the head mounted device 102.
Figure 4B:
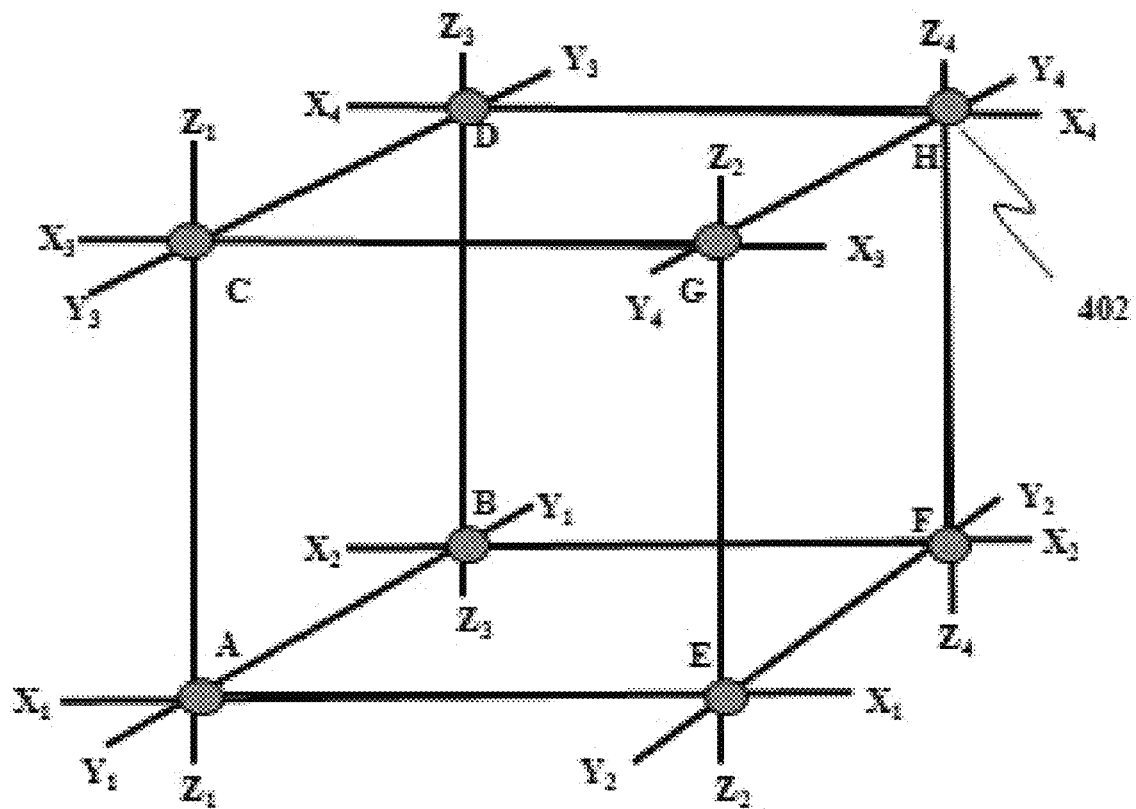
FIG. 4b illustrates coordinates used in multilaminar acoustic matrix display in the head mounted device 102.

Further, the 3-D acoustic speakers are arranged in multi-laminar acoustic matrix display tier unit, producing acoustic sound signals representing pixels transformed codes-in an optical image and also their coordinates in 3-d image frame having these point pixels. The user would perceive the front space in day to day life via this stereo-acoustic matrix system. The cameras capture foreground image from different angles. The captured image is sent to the pocket computer or server computer to create a 3-D optical frame which can be a cuboid having point pixels arranged on its sagital, coronal and transverse planes corresponding to the cardinal point in display system having a speaker to which the optical pixel points are referred as coded sound signals. These are explained as follows The 3-D optical-digital frame interplay with acoustic matrix display having corresponding points. Multiple laminae i.e. planes having imaginary digitally generated (or physical), sound/musical notes coded planes with digital (or physical) sound speakers at intersections (i.e. cardinal points as a, b, c, d, e, f, g and h) of x, y and z coordinates as shown in FIG. 4a and FIG. 4B. The 3-D optical frame is scanned by pocket computer or server and pixels in all its coordinates are translated, projected and perceived on the matrix acoustic display at corresponding points on successive planes or coordinates of display system.

Further, in addition to the 3-D image Hence it is possible to paint a 2-D plane in any axis with a number of adjacent cardinal points getting stimulated and generating coded acoustic signal together and gives a detail idea of shape and size of image on the plane termed as the 2-D acoustic fluorescence pattern.

Colour coded musical note can be added for colour acoustic perception in the planes. All cardinal points at intersection of x, y and z axis coordinates in a 3-D matrix constitutes an acoustic image which is perceived in terms of shape size, colour and is localized in space.

In another embodiment, the composite acoustic projection of all the planes in a 3-D optical frame generates a 3-D acoustic fluorescence pattern which can be termed as stereo acoustic imaging. The laminar planes in display device are coded for separation or distances among them, for the relative distances between different optical planes and images on them can also be made out by sequential projection on successive laminas in a sweeping manner.

During landscape viewing different acoustic matrix planes Y-axis is code for different distance gaps from user and meridional coordinates,X-axis is for direction and altitude is on Z-axis i.e., exact localization in space ahead can be ascertained. On zooming, in planes and coordinates would expand and represent for smaller detail i.e., increased resolution and would constrict on zoom out mode to share more pixels on a single point acoustic display.

In matrix optical-acoustic imaging from M×N computer assisted designed matrix of front view to P×Q acoustic matrix is carried out to create acoustic fluorescence in order to identify shape with defined interface and contrast sensitivity. The 3-D frame of a time instance processed in a pocket computer to develop a 3-D acoustic pattern that is perceived from the matrix tired acoustic display speakers and peripheral speakers are made to work in coordination to give meaningful acoustic pattern. It is also helpful in walking mode with shifting frame model. Object surface quality by specific pattern of sound and colours used to be deciphered via musical notes. Infra red mode is to operate for night vision, object temperature and identifying living beings.

The head mounted devices covers the front view by scanning the objects in fore ground lying at horizontal covering of 120° of front view camera vision. The scanning of view is performed from left to right or right to left and from top to bottom to top, to understand the things via simultaneous corresponding characteristic acoustic pattern on the tiered matrix screen at head mounted device The acoustic pattern generated at tiered matrix screen is to be conveyed to both the ear ossicles of the user through the frontal head bones to let the user extract acoustic information or signal patterns, since the bone conduction of sound is better than air conduction.

Figure 5:
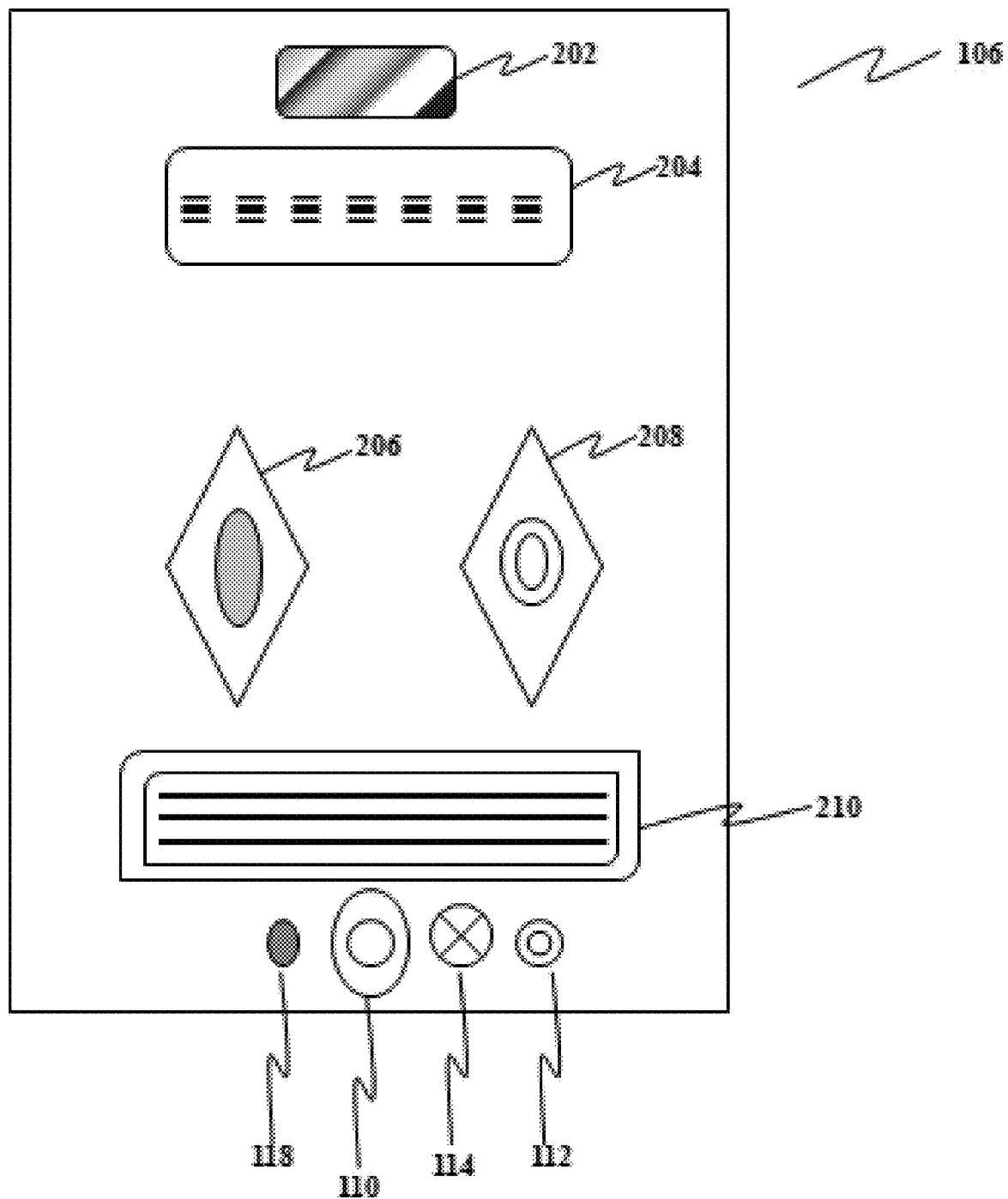
FIG. 5 illustrates the remote 106 for the visual aid.

FIG. 5 is a schematic representation of the remote 106, which is integrated with the optical camera 110, infra red camera 112, radar based camera 114, power button 202, voice command device along with receiver 204, radio/multimedia key with toggle button 206 to select, toggle button 208 to call/dial and search button 210. The toggle button can be electro-mechanical, which makes it easier for the user to operate the same. The search button 210 can be a touch screen, wherein the user is allowed to zoom in or out the cameras present in the head mounted device for a particular object or segment in the frame.

The remote 106 assists an individual in choosing and controlling different functions of the system. The remote 106 initiates a request from the user for an object of interest by giving a verbal dictation in the receiver 204 or by pressing search button 210. The receiver 204 is configured to initiate a call in phone by means of verbal dictation. Further, this request signal is sent to the pocket computer 104. The pocket computer 104 upon acknowledging the request signal, processes accordingly based on the request generated by the user. Further, the signal is sent to GPS equipped mobile hand device 109 and head mounted device 102 via communication network 108.

The pocket computer 104 chooses the mode of operation manually selected by the user in the remote 108 or automatically chooses the mode of operation based on the received signals from the head mounted device 102. The mode of operation is based on the surrounding, locality and brightness, among others.

The head mounted device 102, camera's and the belt tag camera device 103 operate based on the request generated by the user. The optical camera 110 captures the image and colour in frame, in the form of picture by picture element. This signal is further sent to the pocket computer 104, which stores in the form of pixels. The infrared camera 112 captures the image in absolute darkness. It captures the radiated energy into a thermal image of the object in the frame. The radar based camera 114 emits a signal, such as, sound or microwave of particular wavelength, among others, which comes across a hindrance or an object of interest, and a part of the emitted signal is reflected back to the radar based camera 114.

Figure 2B:
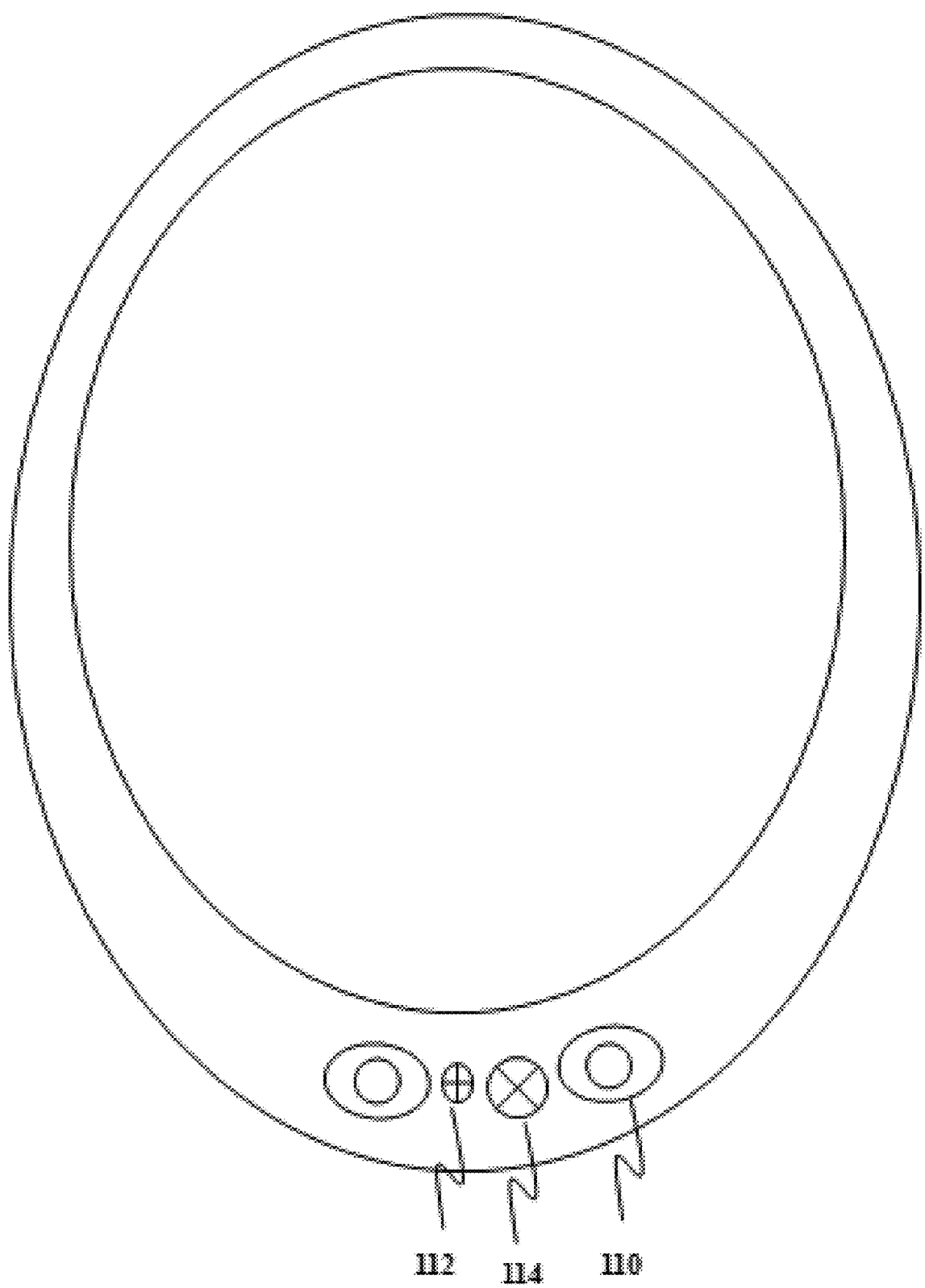

FIG. 2b is a schematic representation of the belt tag camera device 103 is a detachable module, which is integrated with the same set of cameras as in the head mounted device 102. It covers the immediate ground side hurdle and facilitates relative imaging of near objects. The belt tag camera device 103 communicates through the head mounted device 102. Further, the belt tag camera device 103 also communicates with server computer 105 or pocket computer 104, upon the user resides in indoors or crowded space where low lying ground hurdles are required to be detected and managed by appropriate body manoeuvres.

The set of cameras in the head mounted device 102 are located in opposite directions, such that, the user does not need to turn back and front for image and signal acquisition. The camera's upon receiving instructions from the pocket computer 104, captures images and signals, and communicates the same to the pocket computer 104.

Figure 6:
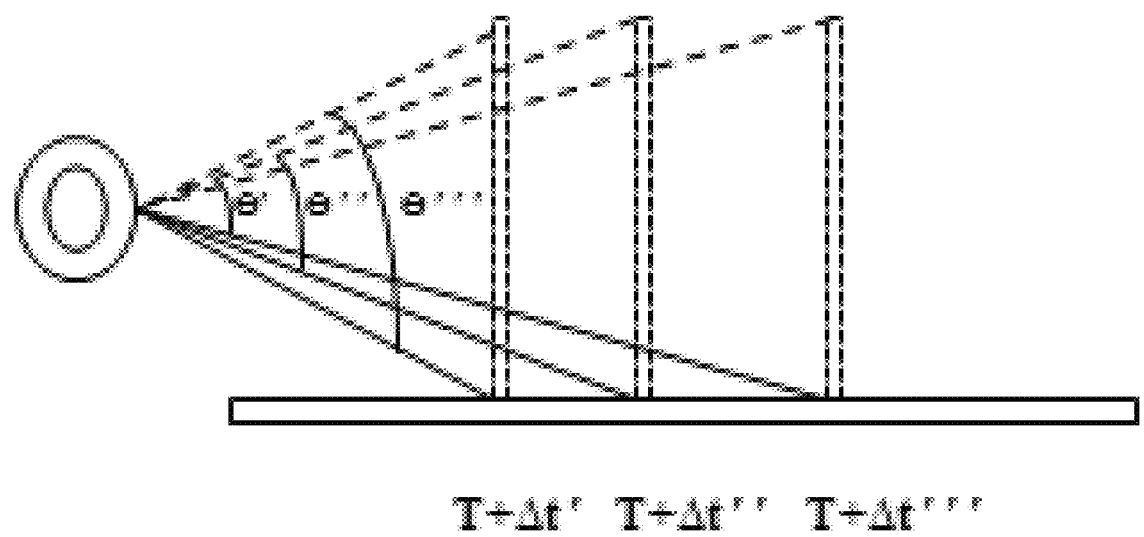
FIG. 6 represents a 2-D angular variation of the relative object moving away or towards the user in the foreground, in accordance with an embodiment.

In the head mounted device 102, the radar based camera emit signals, such as, sound signal or microwave signals, among others, which comes across the obstacle or hindrance or object of interest, and a part of the emitted signal is reflected back to the radar based camera sensor or the head mounted device 102, which is represented in FIG. 6. The reflected signal is based on the principle of Doppler's effect. This signal is further sent to the pocket computer 104 to detect the various scanned objects and hence record the useful information, such as, size, shape, speed of the object and distance of the approaching or moving away object and object lying in the locality of the user, among others.

The pocket computer 104 and server computer 105 are configured and programmed to store the image and the signal captured by the head mounted device 102. Further, the pocket computer 104 and server computer 105 are programmed with artificial intelligence and genetic algorithm to process the scanned objects against the pre fed data, which is loaded periodically from real time experiences with digital selection or by outsourcing tailored images and sound data. The pre fed data comprises of optical scans and associated information of a new place, details of persons as images from various angles, their voice sample, background sound and among others.

In an embodiment, the server computer 105 is operated on behalf of pocket computer 104, when the user is located in usual residing or working environment. In this way, the user can distribute the work and enhance the efficiency of the system.

The GPS equipped mobile hand device 109 is used or selected based on the user's location, which can include a location unknown to the user. The GPS equipped mobile hand device 109 receives signals corresponding to information regarding the location, which is further processed in the pocket computer 104.

The pocket computer 104 stores the scanned images in picture elements i.e. pixel. Further, these pixels are translated pixel by pixel of the light image to sound.

In another embodiment, the system is provided with a scanner and a recorder configured with the pocket computer or server computer. The scanner to scan the text files relating to navigation, figures or images relating to object present in the surrounding and route maps, among others. The recorder to record voice dictation, frequent sounds for familiarity and videos of interest, among others. Further the data corresponding to scanner and recorder is stored in the pocket computer or server computer for furtherance of the system.

Figure 7:
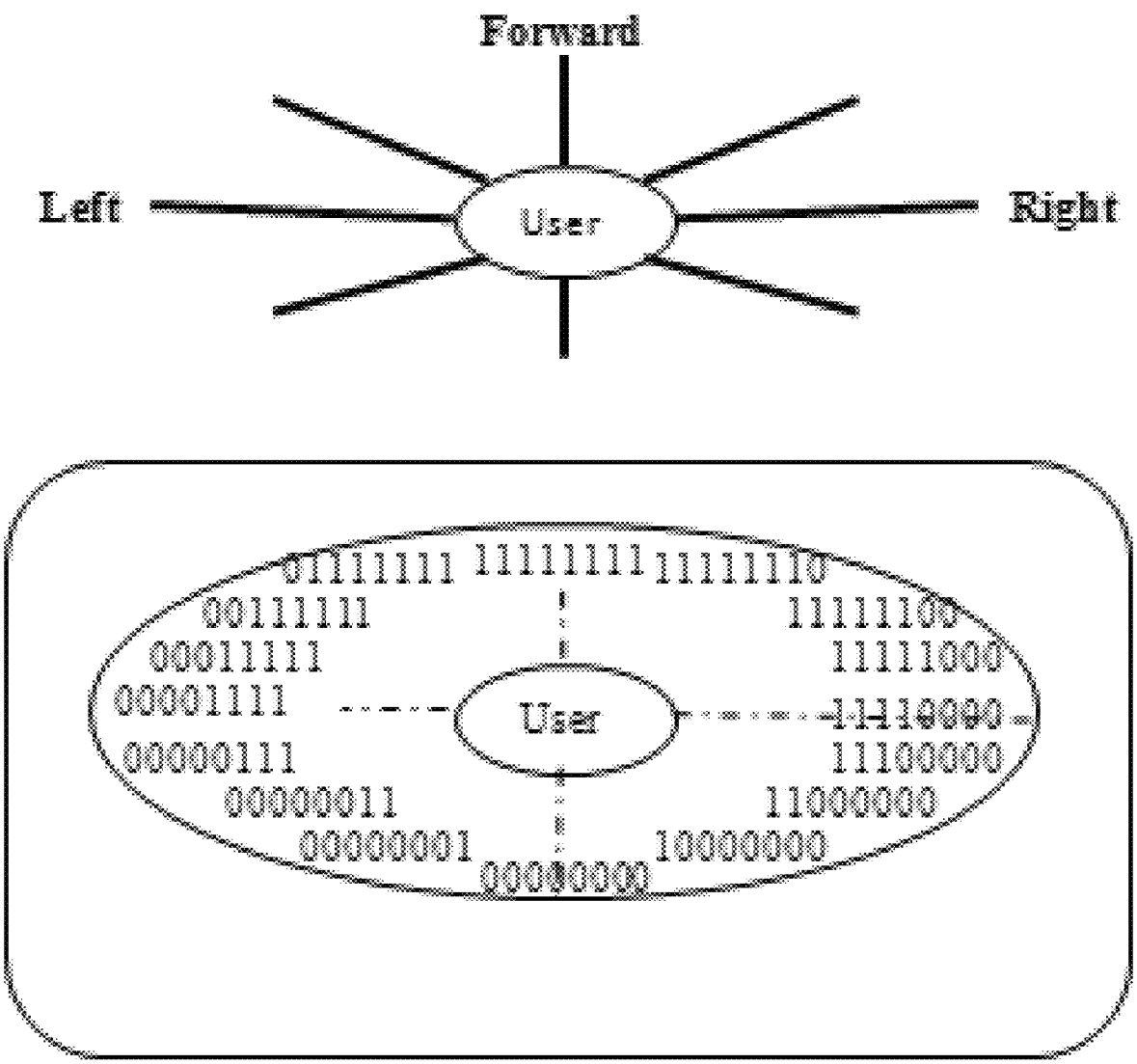
FIG. 7 represents a temporal distribution of binary string patterns that signifies the orientation/direction of an approaching object in a set of possible ways to an individual in the configured X-Y plane within an assumed moving frame at a certain point of time, in accordance with an embodiment.

In an embodiment, the pocket computer 104 is configured and programmed to produce characteristic sound coupled with signal received from the head mounted device 102. FIG. 7 exemplifies a temporal distribution of binary string patterns that signify the orientation/direction of an approaching object in a set of possible ways to a user in the configured X-Y plane within an assumed moving frame at a certain point of time, in accordance with an embodiment. The characteristic sound is programmed and processed using a bit string pattern of length eight bit. The characteristic sound signifies the orientation/direction of an approaching object. A user by formal training can be made familiar to the standard pith variability for entire four directions and he will be able to make instant decision to recognize the most probable direction for other characteristic audible pitches belonging to the frame of this distribution. In an embodiment, the pocket computer 104 analyzes the captured optical image for the relative object distance encountering, coupled with the characteristic pattern of sound from the user from the head mounted device 102. In an embodiment, the pocket computer 104 gathers requisite data for several possible life events and uses the data in future to assist the user.

In the pocket computer 104, the generated signal is processed to notice the hardness or softness of the object present in the scene of the user. This is noticed by the use of energy volume concept, which is governed by the surrounding distributed energy based on the acoustic emission. The energy transformation is carried by comparing the frequency and wavelength, among others, of the emitted and received signal from the radar based camera.

Figure 8:
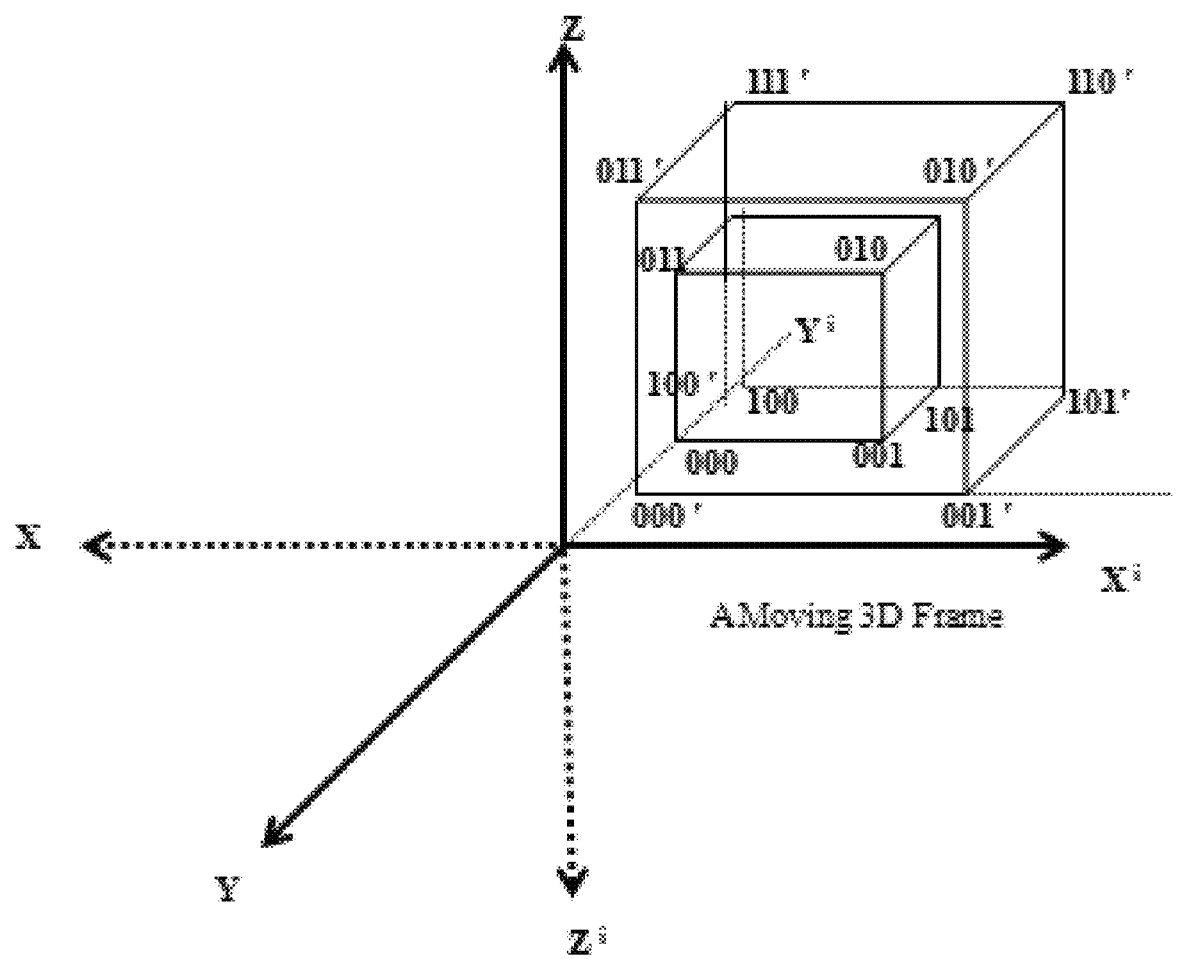
FIG. 8 represents a binary encoded time dependent hypercube concept notation, in accordance with an embodiment.

Further the pocket computer 104 is configured to postulate the transformed energy of the scene with time dependent 3D frame as in FIG. 8 with assumed dimensional 'x', 'y' components. In this, each component corresponds to a characteristic sound with respect to the object or obstacle in the scene. Set of different vectors i, j and k carry information or signals regarding the various energy components as given by equation (1). Further, the energy volume is computed by a matrix based real time computation, which signifies the surrounding orientation and pattern simultaneously. The frame design of foreground at a certain time depends upon the computed total energy volume given in equation (2) with ES and ED being the energy of the static and dynamic object.

$$EN_v = \sum \left\{ \sum_{i=1,j=1,k=1}^{p,q,r} Ex(i, j, k), \sum_{i=1,j=1,k=1}^{p,q,r} Ey(i, j, k), \ldots \ldots \ldots \ldots \right\} \quad 1$$

$$ET(t) = ES(t) + ED(t) \quad 2$$

In an embodiment, the pocket computer 104 develops a 3-D visual image of a time instance coupled with the 3-D acoustic pattern perceived from the multi tiered peripheral speakers. Both multi tiered peripheral speaker and the peripheral speaker placed in the circumference, in combination, give out a characteristics sound coupled with the moving frame. The characteristic sound helps the user in identifying the distance, size, shape and colour of the object at a given instance.

Further, the user needs to be trained with the specific characteristics sound for different spatial orientation of the objects. This characteristic sound reaches the brain frequently and will have temporal acquaintance of the all minor instants collectively and it would assist in identifying objects instantaneously.

III. Exemplary Method

Figure 9:
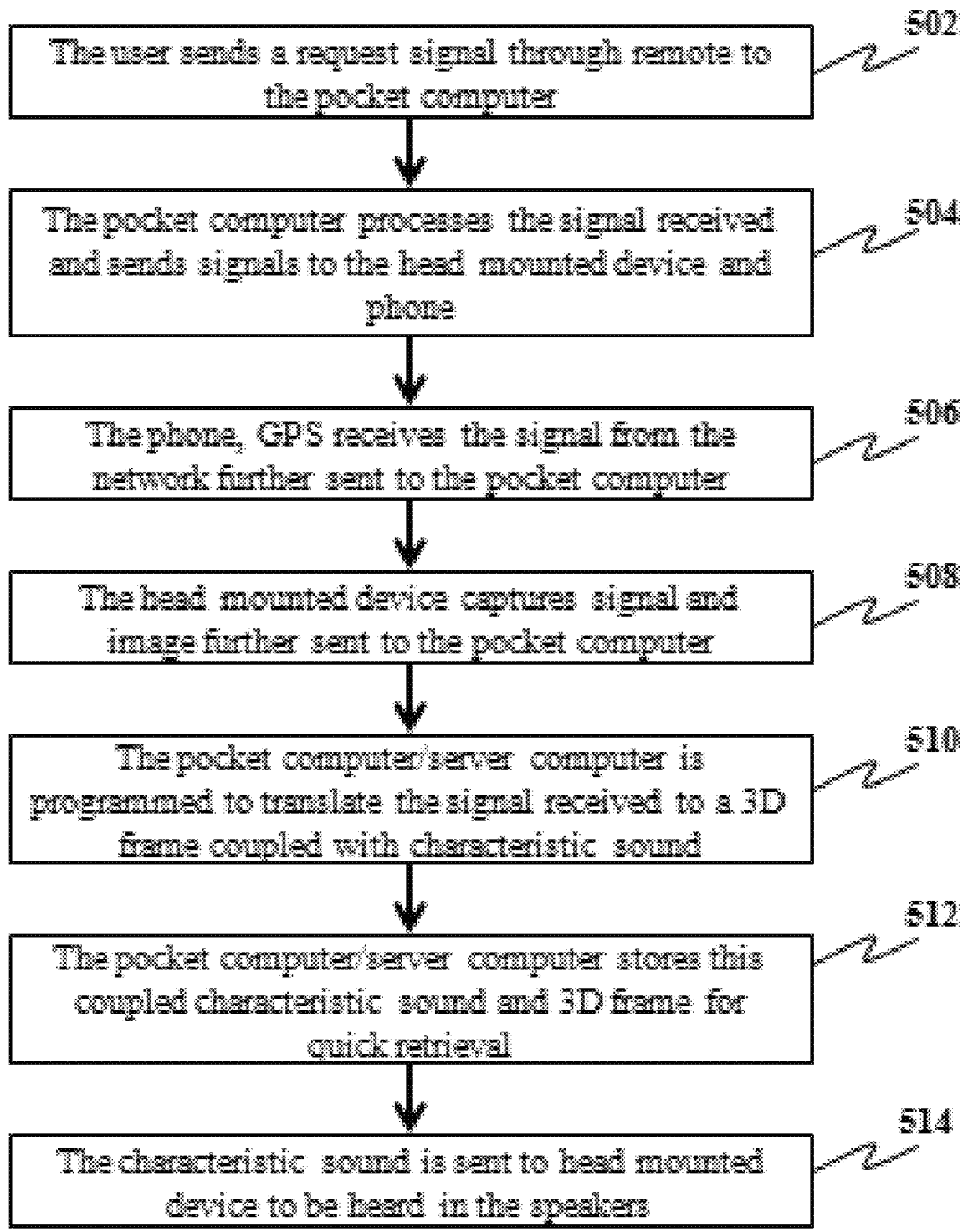
FIG. 9 is a flowchart of an exemplary method for assisting an visually impaired, in accordance with an embodiment.

FIG. 9 is a flowchart of an exemplary method for assisting a visually impaired person, in accordance with an embodiment. The method includes, at step 502, an individual with visual impairment sends a request signal through the remote to the pocket computer 104 via communication network 108. The request can be made by verbal dictation or by pressing electro-mechanical keypad. Subsequently, at step 504, the received signal is acknowledged and processed further by the pocket computer 104. The processed signal enables choosing the mode of operation, object of interest or determine destination, among others. Further, instructions are sent to the head mounted device 102 and GPS equipped mobile hand device 109.

In an embodiment, the head mounted device 102 receives the signal from the pocket computer 104. Upon receiving the signal, GPS equipped mobile hand device 109 operates at step 506 to receive a signal from the network, which is further sent to the pocket computer 104. The pocket computer 104 upon receiving the signal, process the signal received to give a verbal dictation for navigation to the user, which to be heard in the speaker 114 placed in the head mounted device 102.

In an embodiment, the head mounted device 102 receives the signal from the pocket computer 104. Upon receiving the signal, cameras 110 operate accordingly, at step 508, to capture images and signals. The signal captured includes the wavelength or frequency, among others of the emitted and reflected signal. The camera captures the 3D image in the form of picture element of the vicinity of the user.

The head mounted device 102 sends the captured image and signal to the pocket computer 104, at step 510. The pocket computer 104, which is configured and programmed with artificial intelligence and genetic algorithm, processes the signal received from the head mounted device 102 to a 3D frame. This 3D frame is coupled with a characteristic sound.

In an embodiment, the 3D frame coupled with a characteristic sound for each individual event is stored in the pocket computer 104, at step 512, so that, when the user comes across the same event, the data corresponding to the event is retrieved quickly from the pocket computer 104 and the user gets acquainted and easily recognises the object or obstacle present in the scene.

The pocket computer sends the characteristic sound and vocal guidance to the head mounted device 102, which is then sent to head mounted device 102, at step 514. In the head mounted device 102, the characteristic sound and vocal guidance is heard in the speakers. The speakers 114 are placed in different places, so that the user identifies the objects based on the sound heard in a particular or combined speaker.

IV. First Example

In this example, a visually impaired person uses the system 100 for navigating and identifying the object in indoor or inside the building. The user staying indoor sends a request signal through remote. The remote 106 further sends the request signal to the pocket computer 104 via communication network 108. The pocket computer processes, analyzes and compares with the pre-fed data to choose a mode. In this example, the mode of operation is indoor operation. The processed signal is sent to the head mounted device 102 after choosing mode of operation as indoor. In the head mounted device 102, the cameras start operating, wherein each camera has a desired function to perform, such as, optical camera 110 captures the 3D image, infrared camera 112 captures the image during the absence of light and measures the temperature of the object and gathers thermal properties of the object, radar based camera 114 measures the distance of the object from the user, shape and size of the object, hardness or softness of object. The cameras capture the image and signal of the foreground. The signal comprises of image, audio and microwave signals, among others. The radar based camera 114 emits a signal of a particular type, which is reflected back to the sensors, when the signal comes across object, obstacle or hindrance.

Further, the user changes cameras position and zoom's in to view the objects in motion, which is perceived by change of plane stimulated from distal to proximal or proximal to distal in the tier device. Objects in the frame are localized by laminar tier device and its identification details is informed by pocket computer 104 programmed with artificial intelligence.

The signal and image captured in the head mounted device 102 is sent to the server computer 105 for further processing. The server computer 105 programmed with artificial intelligence and genetic algorithm analyzes and compares the received signal with the pre fed data or existing data.

The server computer 105 generates a frame-shift model, wherein the user is self projected into a 3-D optional space ahead while walking or moving and making way through objects and guided to pass the hurdles.

The server computer 105 further processes the signal and generates a frame coupled with a characteristic sound. The characteristic sound is based on the object present in the frame with respect to relative motion of the user himself.

The characteristic sound generated is sent to the head mounted device 102, which is heard in speaker. The speakers are placed in different spot on the head mounted device, so that the user can easily identify the direction, distance, shape, size and colour of the object based on the characteristic sound produced in different speakers at an instance.

V. Second Example

In this example, a visually impaired person uses the system 100 for navigating and identifying the object in outdoor. The user sends a request using the remote. The remote 108 further sends the request signal to the pocket computer 104 via communication network 108. The pocket computer 104 processes, analyzes and compares with the pre-fed data to choose a mode. In this example, the mode of operation is outdoor operation. The processed signal is sent to the GPS equipped mobile hand device 109, wherein the GPS equipped mobile hand device 109 operates and receives a signal from the network. The received signal from the network is sent to the pocket computer 104. Further, the head mounted device 102, upon receiving the signal, instructs the cameras 110 to capture the image and signal of the foreground. The signal comprises of audio and image signals and microwave signals, among others. These signals are sent to the pocket computer 104 for further processing along with the signal received from the GPS equipped mobile hand device 109 to translate the scene of the user to a 3D frame coupled with the characteristic sound or even a verbal dictation for navigation, which is heard in the speakers placed in the head mounted device 102.

The characteristic sound heard in the speakers is based on the user's frame, wherein the frame includes that the user comes across an obstacle and there is chance of colliding with obstacle, the sound generated suggest such that the user takes an alternative path and also send the request signal to the pocket computer 104 to guide the user in navigating.

Further, the head mounted device 102 scans the traffic signal and reads the sign boards and generates a characteristic sound or a verbal dictation to proceed or stop based on the traffic signal and sign boards.

In an embodiment, the head mounted device 102 can send sound or light signal to the traffic to cooperate blind person for passage through alarm sound speaker or alarm light blinker 115.

VI. Conclusion

The embodiment assists a visually impaired individual in navigating and identifying the objects of interest. The embodiment helps the individual to get acquainted with his/her routine activities.

The processes described above is described as sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

We claim:

1. A system for assisting and guiding a visually impaired person, the system comprising:
   a remote configured to take request from a user;
   a head mounted device of generally a circular configuration adapted to be worn around the head of the user, configured to capture an image and first signal in the vicinity of the user;
   multiple first speakers placed along circumference of the head mounted device in a multi-laminar matrix pattern comprising a distribution of multiple coordinates in different meridians to play audio signal regarding objects and navigation;
   a GPS to navigate in a remote location; and
   a computer configured to receive input from the remote, the head mounted device and the GPS, and process, the image and the first signal captured by the head mounted device, the request received by the remote and GPS location identified by the GPS;
   wherein,
      the computer, as a result of processing, generates a 3-D visual image and a 3-D acoustic pattern, wherein the 3-D visual image is coupled to the 3-D acoustic pattern, wherein the computer segments the 3-D visual image in terms of multiple proximal to distal planes and identifies pixels corresponding to the 3-D visual image at various coordinates on x, y and z axes, wherein based on energy ensemble of each pixel, the segments of the 3-D visual image are encoded into the 3-D acoustic pattern; and
      the audio signals are played in a selection of the first speakers placed along circumference of the head mounted device, wherein the first speakers are selected so as to enable the user to perceive the audio signal as the 3-D acoustic pattern.

2. The system according to claim 1, wherein the remote is integrated with one or more cameras, a receiver integrated with voice command device and an electro-mechanical keypad with search button and dialing button.

3. The system according to claim 1, wherein the head mounted device is integrated with a detachable device and one or more first cameras, wherein the detachable device captures images of objects closer to the head mounted device and communicates with the head mounted device.

4. The system according to claim 3, wherein the detachable device is integrated with one more second cameras and one or more second speakers.

5. The system according to claim 3, wherein the first cameras are located in opposite directions.

6. The system according to claim 3, wherein the first speakers are placed in order of a multi tier system.

7. The system according to claim 3, wherein the first cameras integrated in the head mounted device comprises an optical stereo camera, a radar based camera and an infrared camera.

8. The system according to claim 7, wherein the optical stereo camera captures the 3D image of the surrounding, a spectral analysis identifies the colour of the object, the infrared camera detects objects in the absence of light, and the radar based camera emits a signal of particular frequency and wavelength, wherein a part of the emitted signal is reflected back, which facilitates gathering information regarding the size and shape of the object and the distance between the object and the user.

9. The system according to claim 1, wherein the computer is configured and programmed with artificial intelligence and genetic algorithm for storing and processing the input received from the head mounted device.

10. The system according to claim 1, wherein the computer postulates a set of characteristic sound comprising the 3-D acoustic pattern to signify the direction of an approaching object and orientation of the object based on shape, size and hardness of the object.

11. The system according to claim 1, wherein the computer processes the input received from the head mounted device and the GPS to postulate the 3D visual image frame coupled with a characteristic sound comprising the 3-D acoustic pattern.

12. The system according to claim 1, wherein the computer is configured to store 3D images coupled with characteristic sound comprising the 3-D acoustic pattern for individual events.

13. The system according to claim 1, wherein the first speakers in the head mounted device receive the audio signals from the computer, wherein the audio signals correspond to one or more of verbal dictation regarding navigation and name of the object.

14. The system according to claim 1, wherein the first speakers are placed in different spots in the head mounted device, thereby facilitating hearing of audible characteristic sound comprising the 3-D acoustic pattern produced individually or combined to get acquainted of the vicinity and to recognize the object.

15. The system according to claim 1, wherein the system is configured to scan, record, store and reproduce data, wherein the data corresponds to texts, figures, audio and video.

16. A method for assisting and guiding a visually impaired person, the method comprising:
   receiving a request from a user through a remote;
   capturing an image and a first signal in the vicinity of the user through a head mounted device;
   receiving input comprising, the request from the remote, the captured image and the first signal from the head mounted device and GPS position from a GPS;
   processing the input received from the head mounted device, the remote and the GPS;
   generating a 3-D visual image and a 3-D acoustic pattern as a result of processing the received input by segmenting the 3-D visual image in terms of multiple proximal to distal planes and identifying pixels corresponding to the 3-D visual image at various coordinates on x, y and z axes to encode the segments of the 3-D visual images into the 3-D acoustic pattern, based on energy ensemble of each pixel in the 3-D visual image;
   coupling the generated 3-D visual image with the 3-D acoustic pattern;
   communicating audio signal generated by a computer, regarding identified objects and navigation by playing sounds in multiple speakers; and
   enabling selection of speakers to perceive the 3-D acoustic pattern by the user.

17. The method according to claim 16, wherein capturing the image and the first signal comprises capturing the 3D image of the surrounding, identifying the colour of the object, detecting objects in the absence of light, and emitting a signal of particular frequency and wavelength, wherein a part of the emitted signal is reflected back, which facilitates gathering information regarding the size and shape of the object and the distance between the object and the user.

18. The method according to claim 16, further comprising postulating a set of characteristic sound comprising the 3-D acoustic pattern to signify the direction of an approaching object and orientation of the object based on shape, size and hardness of the object.

19. The method according to claim 16, further comprising a set of characteristic sound comprising the 3-D acoustic pattern is heard in a multi-laminar matrix acoustic display device placed in the circumference of the head mounting device.

20. The method according to claim 16, further comprising a set of characteristic sound comprising the 3-D acoustic pattern is heard individually or in the combination of the multiple speakers placed in the circumference of the head mounting device to give a meaningful acoustic sound.

* * * * *